United States Patent
Trika et al.

(10) Patent No.: US 12,253,945 B2
(45) Date of Patent: Mar. 18, 2025

(54) DISK CACHING AND/OR TIERING WITH DEVICE INTERNAL BUSY INFORMATION

(71) Applicant: Intel Corporation, Santa Clara, CA (US)

(72) Inventors: Sanjeev Trika, Portland, OR (US); Piotr Wysocki, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 805 days.

(21) Appl. No.: 17/313,529

(22) Filed: May 6, 2021

(65) Prior Publication Data

US 2021/0255955 A1 Aug. 19, 2021

(51) Int. Cl.
*G06F 12/0811* (2016.01)
*G06F 12/0862* (2016.01)

(52) U.S. Cl.
CPC ...... *G06F 12/0811* (2013.01); *G06F 12/0862* (2013.01); *G06F 2212/1024* (2013.01)

(58) Field of Classification Search
CPC ............. G06F 12/0811; G06F 12/0862; G06F 12/0868; G06F 12/0897; G06F 2212/1024; G06F 2212/28; G06F 2212/283; G06F 2212/31; G06F 2212/313; G06F 2212/14; G06F 2212/22; G06F 2212/222; G06F 3/0646; G06F 3/061; G06F 3/0611; G06F 3/0683; G06F 3/0685
See application file for complete search history.

(56) References Cited

U.S. PATENT DOCUMENTS

| | | | |
|---|---|---|---|
| 10,891,233 B2 | 1/2021 | Burridge et al. | |
| 11,314,416 B1* | 4/2022 | Shveidel | G06F 3/064 |
| 2005/0289301 A1* | 12/2005 | Woo | G06F 13/1642 |
| | | | 711/137 |
| 2012/0173792 A1* | 7/2012 | Lassa | G06F 3/0659 |
| | | | 711/E12.008 |
| 2016/0062895 A1* | 3/2016 | Bisht | G06F 12/0891 |
| | | | 711/113 |
| 2018/0300084 A1* | 10/2018 | Kachare | G06F 11/3452 |
| 2018/0349040 A1* | 12/2018 | Kabra | G06F 12/0292 |
| 2019/0042441 A1* | 2/2019 | Burridge | G06F 12/0866 |
| 2020/0004455 A1* | 1/2020 | Williams | G06F 12/0246 |
| 2020/0319815 A1 | 10/2020 | Dutta et al. | |
| 2020/0334085 A1* | 10/2020 | Qiu | G06F 9/5016 |
| 2021/0200698 A1* | 7/2021 | Tanpairoj | G06F 13/1668 |

* cited by examiner

*Primary Examiner* — Tracy A Warren
(74) *Attorney, Agent, or Firm* — Jordan IP Law, LLC

(57) ABSTRACT

Systems, apparatuses and methods may provide for technology that detects, via a processor external to a solid state drive (SSD), internal information associated with the SSD, detects background operations with respect to the SSD based on the internal information, wherein the background operations include one or more of current operations or predicted operations, and adjusts a hierarchical data placement policy based on the background operations.

20 Claims, 3 Drawing Sheets

DISK CACHING AND/OR TIERING WITH DEVICE INTERNAL BUSY INFORMATION

TECHNICAL FIELD

Embodiments generally relate to memory structures. More particularly, embodiments relate to disk caching and/or tiering with device internal busy information.

BACKGROUND

Disk caching may offer a balance of capacity, cost and performance to end-users. Two common disk caching configurations are (a) a NAND solid state drive (SSD) being used to cache data for one or more hard disk drives (HDDs), and (b) a high-performance (e.g., INTEL OPTANE) SSD being used to cache data for one or more NAND SSDs. In either case, the performance of the NAND SSDs impacts system throughput and quality of service (QoS). Unfortunately, NAND SSDs typically conduct background relocations (e.g., defragmentation operations) that have a negative impact on NAND SSD performance, and therefore overall system performance.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
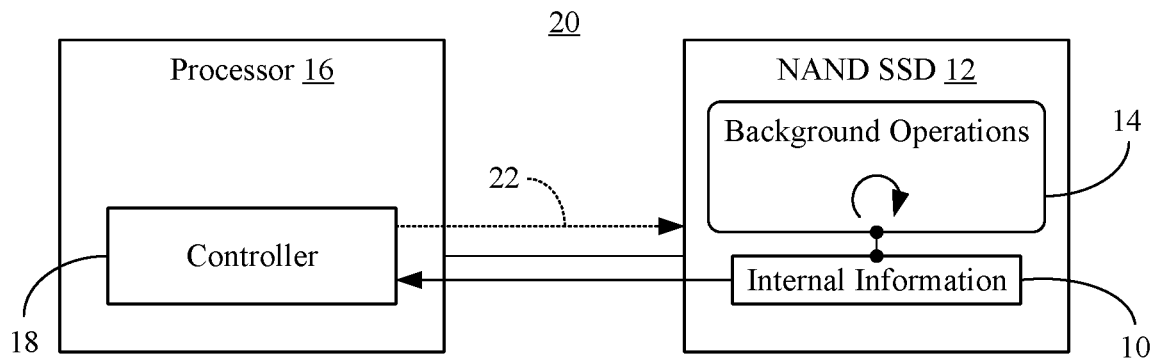
FIG. 1 is a block diagram of an example of an information exchange between a NAND SSD and an external processor according to an embodiments.

Turning now to FIG. 1, a computing architecture 20 (e.g., performance-enhanced computing system) is shown in which at least one NAND SSD 12 conducts background operations 14 such as, for example, defragmentation (e.g., "defrag") operations, data scrubbing operations, data refresh operations, wear leveling operations, etc., or any combination thereof. The background operations 14 may also include current operations and/or predicted (e.g., future) operations. In an embodiment, internal information 10 (e.g., internal busy information) corresponding to the background operations 14 is sent to a controller 18 (e.g., cache controller, tiering controller) in an external processor 16 (e.g., host processor, central processing unit/CPU, accelerator, peer-to-peer disk processor).

In one example, the internal information 10 includes a first asynchronous notification of a start of the background operations 14 and a second asynchronous notification of an end of the operations 14. In another example, the internal information 10 includes a measurement of background input/output (I/O) data (e.g., in units of expected impact on host I/O operations), wherein the external processor 16 issues a request 22 for the measurement of background I/O data. The internal information 10 may also include a first measurement of host-issued I/O data and a second measurement of media I/O data (e.g., based on log, statistical and/or telemetry data), wherein the external processor 16 issues the request 22 for the first measurement and the second measurement.

In an embodiment, the external processor 16 adjusts a hierarchical data placement policy (e.g., caching policy, tiering policy) based on the background operations 14. For example, the controller 18 might skip/bypass an insert of data into the NAND SSD 12 when the internal information 10 indicates that the NAND SSD 12 is either currently conducting the background operations 14 or is predicted/expected to conduct the background operations 14. Additionally, the controller 18 may insert additional data into the NAND SSD 12 (e.g., via a change to insert caching policy thresholds), conduct cache flushes, prefetch data, etc., when the internal information 10 indicates that the background operations 14 have fallen below a threshold (e.g., an idle condition). In an embodiment, the term "caching" refers to hierarchical data placement, which may include data tiering and data caching. As will be discussed in greater detail, detecting the background operations 14 based on the internal information 10 enables the external processor 16 to improve the overall performance of the computing architecture 20.

The NAND SSD 12 may be part of a memory device that includes non-volatile memory and/or volatile memory. Non-volatile memory is a storage medium that does not require power to maintain the state of data stored by the medium. In one embodiment, the memory structure is a block addressable storage device, such as those based on NAND or NOR technologies. A storage device may also include future generation nonvolatile devices, such as a three-dimensional (3D) crosspoint memory device, or other byte addressable write-in-place nonvolatile memory devices. In one embodiment, the storage device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The term "storage device" may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD235, JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

Figure 2A:
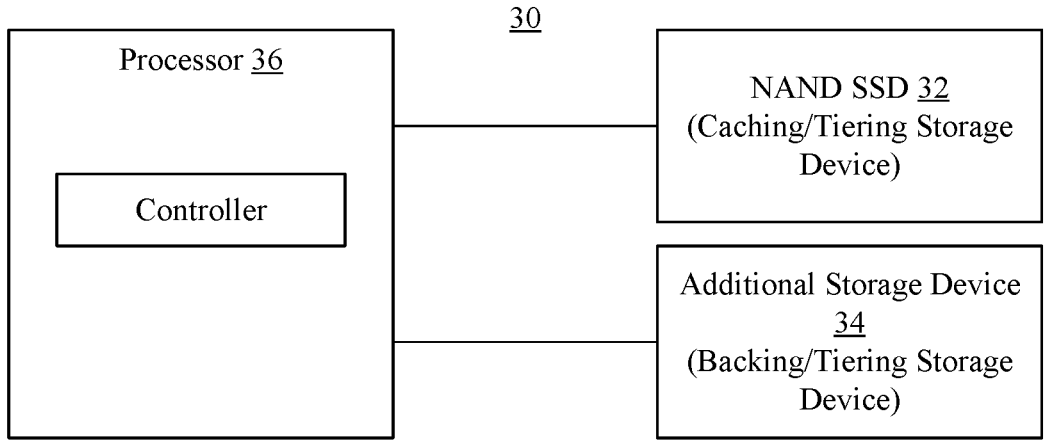
FIGS. 2A and 2B are block diagrams of examples of disk caching configurations according to embodiments.

FIG. 2A shows a computing architecture 30 in which a NAND SSD 32 is a caching storage device for an additional storage device 34 (e.g., HDD, backing storage device). In such a case, an external processor 36 may wait until an idle condition is detected with respect to the NAND SSD 32 (e.g., background operations have fallen below a threshold) before flushing dirty cache lines from the NAND SSD 32 (e.g., via one or more "lazy writes"), retrieving prefetch data from the additional storage device 34, and writing the prefetch data to the NAND SSD 32. The lazy writes improve system write performance since subsequent evictions of the associated cache lines obviate writes to the NAND SSD 32. The prefetches improve system read performance due to higher hit rates in the NAND SSD 32. In an alternative tiering embodiment, the NAND SSD 32 may represent a lower-level drive in a storage hierarchy than the additional storage device 34. The additional storage device 34 may include a single drive or a volume on top of an array of drives.

Figure 2B:
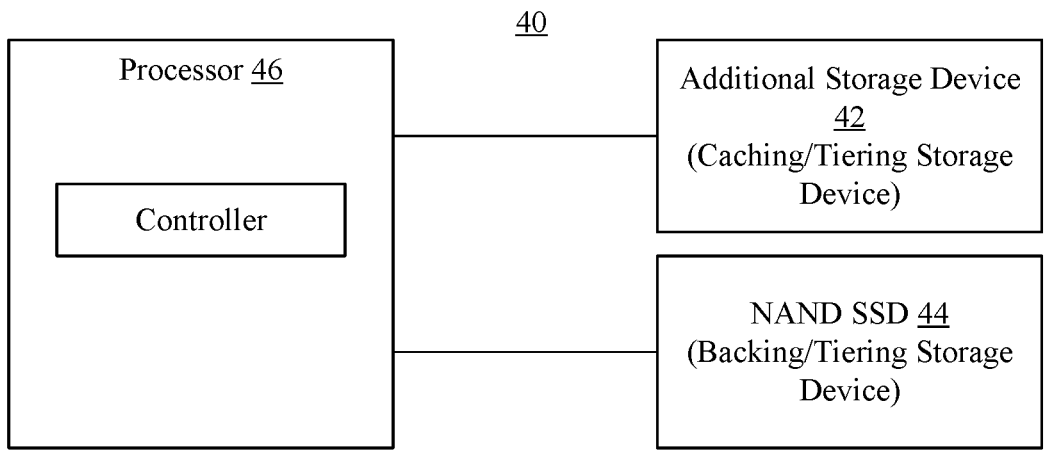

FIG. 2B shows a computing architecture 40 in which an additional storage device 42 (e.g., high-performance INTEL OPTANE SSD) is a caching storage device for a NAND SSD 44. In such a case, an external processor 46 may wait until an idle condition is detected with respect to the NAND SSD 44 (e.g., background operations have fallen below a threshold) before flushing dirty cache lines from the additional storage device 42 (e.g., via one or more lazy writes), retrieving prefetch data from the NAND SSD 44, and writing the prefetch data to the additional storage device 42. Again, the lazy writes may improve system write performance since subsequent evictions of the associated cache lines obviate writes to the additional storage device 42. The prefetches improve system read performance due to higher hit rates in the additional storage device 42. In an alternative tiering embodiment, the additional storage device 42 may represent a lower-level drive in a storage hierarchy than the NAND SSD 44. The additional storage device 42 may include a single drive or a volume on top of an array of drives.

Figure 3:
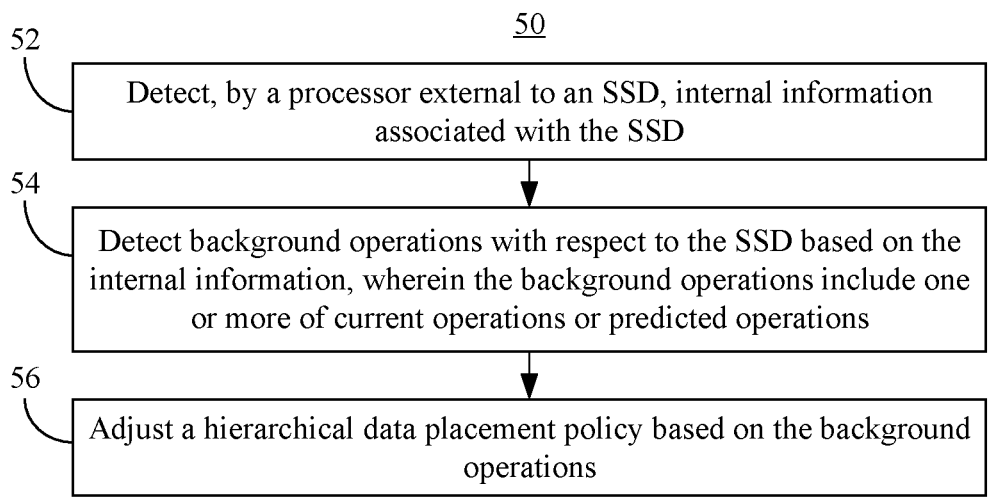
FIGS. 3-4 are flowcharts of examples of methods of operating a processor according to an embodiment.

FIG. 3 shows a method 50 of operating a performance-enhanced computing system. The method 50 may generally be implemented in a processor such as, for example, the external processor 16 (FIG. 1), the external processor 36 (FIG. 2A) and/or the external processor 46 (FIG. 2B), already discussed. More particularly, the method 50 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field-programmable gate arrays (FPGAs), complex programmable logic devices (CPLDs), in fixed-functionality hardware logic using circuit technology such as, for example, application-specific integrated circuit (ASIC), complementary metal oxide semiconductor (CMOS) or transistor-transistor logic (TTL) technology, or any combination thereof.

Illustrated processing block 52 provides for detecting, by a processor external to an SSD (e.g., NAND SSD), internal information associated with the SSD. In an embodiment, block 54 detects background operations with respect to the SSD based on the internal information. In the illustrated example, the background operations include one or more of current operations or predicted operations. The internal information may include a first asynchronous notification of a start of the background operations and a second asynchronous notification of an end of the background operations. The internal information may also include a measurement of background I/O data, where a spike in background I/O data is indicative of background operations. In such a case, block 54 may involve issuing a request (e.g., via an appropriate command) for the measurement. In another example, the internal information includes a first measurement of host-issued I/O data and a second measurement of media I/O data, wherein a significantly larger amount of medio I/O data than host-issued I/O data may be indicative of background operations. In such a case, block 54 may involve issuing a request/command for the first measurement and the second measurement.

Block 56 adjusts a hierarchical data placement policy (e.g., caching policy, tiering policy) based on the background operations. For example, block 56 might include skipping/bypassing an insert of data into the SSD when the internal information indicates that the SSD is either currently conducting the background operations or is predicted/expected to conduct the background operations. The illustrated method 50 therefore enhances performance at least to the extent that detecting background operations externally to the SSD enables the system to render the hierarchical data placement policy more effective.

Figure 4:
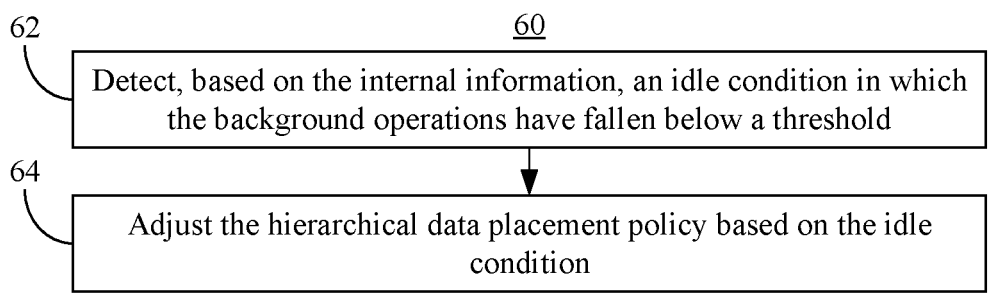

FIG. 4 shows a method 60 of operating a performance-enhanced computing system. The method 60 may generally be implemented in a processor such as, for example, the external processor 16 (FIG. 1), the external processor 36 (FIG. 2A) and/or the external processor 46 (FIG. 2B), already discussed. More particularly, the method 60 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 62 provides for detecting, based on the internal information, an idle condition in which the background operations have fallen below a threshold. In an embodiment, block 64 adjusts the hierarchical data placement policy based on the idle condition. Block 64 may include inserting additional data into the SSD (e.g., via a change to insert caching policy thresholds), conducting cache flushes, prefetching data, and so forth, in response to the idle condition.

Figure 5A:
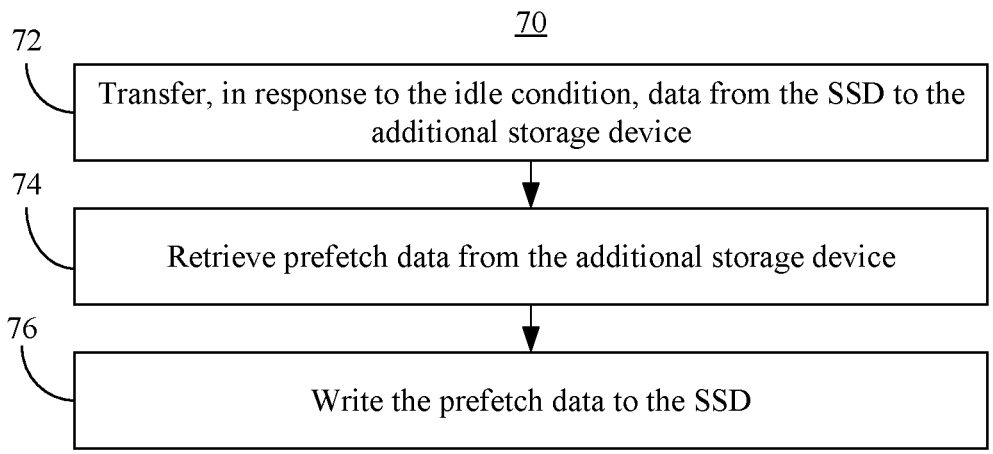
FIG. 5A is a flowchart of an example of a method of operating a processor when a NAND SSD is a caching storage device for an additional storage device according to an embodiment.

FIG. 5A shows a method 70 of operating a performance-enhanced computing system in which an SSD is a caching storage device for an additional storage device. The method 70 may generally be implemented in a processor such as, for example, the external processor 16 (FIG. 1), the external processor 36 (FIG. 2A) and/or the external processor 46 (FIG. 2B), already discussed. More particularly, the method 70 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 72 transfers (e.g., flushes), in response to an idle condition, data (e.g., one or more dirty cache lines via a lazy write) from the SSD to the additional storage device. In an embodiment, block 74 retrieves prefetch data from the additional storage device, where block 76 writes the prefetch data to the SSD. The lazy writes improve system write performance because subsequent evicts of the associated cache lines obviate required SSD writes. The method 70 further enhances performance at least to the extent that writing the prefetch data to the SSD increases hit rates in the SSD and improves system read performance.

Figure 5B:
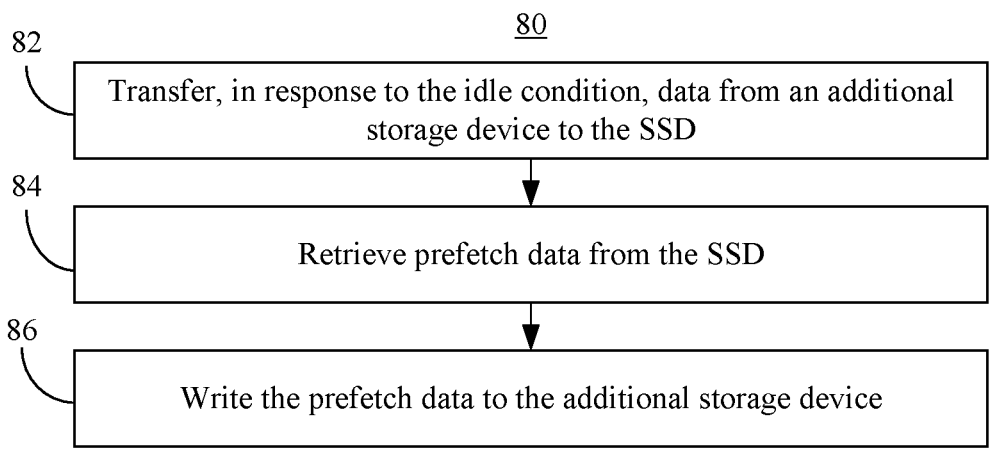
FIG. 5B is a flowchart of an example of a method of operating a processor when an additional storage device is a caching storage device for a NAND SSD according to an embodiment.

FIG. 5B shows a method 80 of operating a performance-enhanced computing system in which an additional storage device is a caching storage device for an SSD. The method 80 may generally be implemented in a processor such as, for example, the external processor 16 (FIG. 1), the external processor 36 (FIG. 2A) and/or the external processor 46 (FIG. 2B), already discussed. More particularly, the method 80 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 82 transfers (e.g., flushes), in response to an idle condition, data (e.g., one or more dirty cache lines via a lazy write) from the additional storage device to the SSD. In an embodiment, block 84 retrieves prefetch data from the SSD, where block 86 writes the prefetch data to the additional storage device. The lazy writes improve system write performance because subsequent evicts of the associated cache lines obviate required additional storage device writes. The method 80 further enhances performance at least to the extent that writing the prefetch data to the additional storage device increases hit rates in the additional storage device and improves system read performance.

Figure 6:
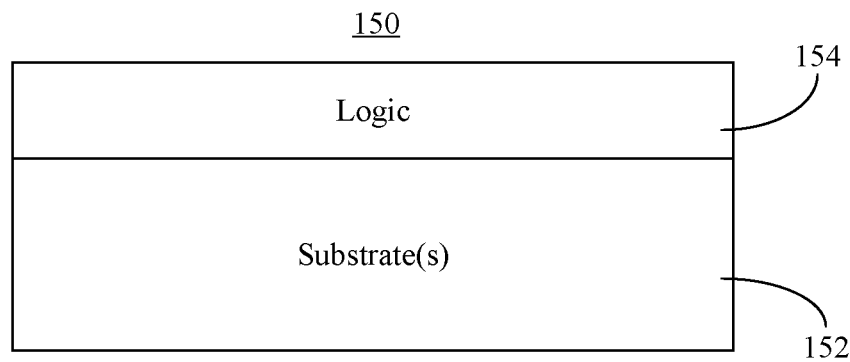
FIG. 6 is an illustration of an example of a semiconductor apparatus according to an embodiment.

FIG. 6 shows a semiconductor apparatus 150 (e.g., chip and/or package). The illustrated apparatus 150 includes one or more substrates 152 (e.g., silicon, sapphire, gallium arsenide) and logic 154 (e.g., transistor array and other integrated circuit/IC components) coupled to the substrate(s) 152. In an embodiment, the logic 154 implements one or more aspects of the method 50 (FIG. 3), the method 60 (FIG. 4), the method 70 (FIG. 5A) and/or the method 80 (FIG. 5B), already discussed. Thus, the logic 154 may detect, by a processor, internal information associated with an SSD, wherein the processor is external to the SSD. The logic 154 may also detect background operations with respect to the SSD based on the internal information, wherein the background operations include one or more of current operations or predicted operations. In an embodiment, the logic 154 adjusts a hierarchical data placement policy (e.g., caching policy, tiering policy) based on the background operations. The semiconductor apparatus 150 is therefore considered performance-enhanced at least to the extent that detecting the background operations based on the internal information enables the processor to render the hierarchical data placement policy more effective.

In one example, the logic 154 includes transistor channel regions that are positioned (e.g., embedded) within the substrate(s) 152. Thus, the interface between the logic 154 and the substrate 152 may not be an abrupt junction. The logic 154 may also be considered to include an epitaxial layer that is grown on an initial wafer of the substrate 152.

ADDITIONAL NOTES AND EXAMPLES

Example 1 includes at least one computer readable storage medium comprising a set of instructions, which when executed by a processor, cause the processor to detect internal information associated with a solid state drive (SSD), wherein the processor is to be external to the SSD, detect background operations with respect to the SSD based on the internal information, wherein the background operations are to include one or more of current operations or predicted operations, and adjust a hierarchical data placement policy based on the background operations.

Example 2 includes the at least one computer readable storage medium of Example 1, wherein the instructions, when executed, further cause the processor to detect, based on the internal information, an idle condition in which the background operations have fallen below a threshold, and adjust the hierarchical data placement policy based on the idle condition.

Example 3 includes the at least one computer readable storage medium of Example 2, wherein the SSD is a caching storage device for an additional storage device and wherein the instructions, when executed, further cause the processor to transfer, in response to the idle condition, data from the SSD to the additional storage device, retrieve prefetch data from the additional storage device, and write the prefetch data to the SSD.

Example 4 includes the at least one computer readable storage medium of Example 2, wherein an additional storage device is a caching storage device for the SSD and wherein the instructions, when executed, further cause the processor to transfer, in response to the idle condition, data from the additional storage device to the SSD, retrieve prefetch data from the SSD, and write the prefetch data to the additional storage device.

Example 5 includes the at least one computer readable storage medium of Example 1, wherein the internal information is to include a first asynchronous notification of a start of the background operations and a second asynchronous notification of an end of the background operations.

Example 6 includes the at least one computer readable storage medium of Example 1, wherein the internal information is to include a measurement of background input/output (I/O) data, and wherein the instructions, when executed, further cause the processor to issue a request for the measurement.

Example 7 includes the at least one computer readable storage medium of Example 1, wherein the internal information is to include a first measurement of host-issued input/output (I/O) data and a second measurement of media I/O data, and wherein the instructions, when executed, further cause the processor to issue a request for the first measurement and the second measurement.

Example 8 includes the at least one computer readable storage medium of any one of Examples 1 to 7, wherein the background operations are to include one or more of defragmentation operations, data scrubbing operations, data refresh operations, or wear leveling operations, and wherein the hierarchical data placement policy is to include one or more of a caching policy or a tiering policy.

Example 9 includes a performance-enhanced computing system comprising a solid state drive (SSD), a processor coupled to the SSD, wherein the processor is external to the SSD, and an additional storage device coupled to the processor, wherein one or more of the SSD or the additional storage device include a set of instructions, which when executed by the processor, cause the processor to detect internal information associated with the SSD, detect background operations with respect to the SSD based on the internal information, wherein the background operations are to include one or more of current operations or predicted operations, and adjust a hierarchical data placement policy based on the background operations.

Example 10 includes the computing system of Example 9, wherein the instructions, when executed, further cause the processor to detect, based on the internal information, an idle condition in which the background operations have fallen below a threshold, and adjust the hierarchical data placement policy based on the idle condition.

Example 11 includes the computing system of Example 10, wherein the SSD is a caching storage device for the additional storage device and wherein the instructions, when executed, further cause the processor to transfer, in response to the idle condition, data from the SSD to the additional storage device, retrieve prefetch data from the additional storage device, and write the prefetch data to the SSD.

Example 12 includes the computing system of Example 10, wherein the additional storage device is a caching storage device for the SSD and wherein the instructions, when executed, further cause the processor to transfer, in response to the idle condition, data from the additional storage device to the SSD, retrieve prefetch data from the SSD, and write the prefetch data to the additional storage device.

Example 13 includes the computing system of Example 9, wherein the internal information is to include a first asynchronous notification of a start of the background operations and a second asynchronous notification of an end of the background operations.

Example 14 includes the computing system of Example 9, wherein the internal information is to include a measurement of background input/output (I/O) data, and wherein the instructions, when executed, further cause the processor to issue a request for the measurement.

Example 15 includes the computing system of Example 9, wherein the internal information is to include a first measurement of host-issued input/output (I/O) data and a second measurement of media I/O data, and wherein the instructions, when executed, further cause the processor to issue a request for the first measurement and the second measurement.

Example 16 includes the computing system of any one of Examples 9 to 15, wherein the background operations are to include one or more of defragmentation operations, data scrubbing operations, data refresh operations, or wear leveling operations, and wherein the hierarchical data placement policy is to include one or more of a caching policy or a tiering policy.

Example 17 includes a processor comprising one or more substrates, and logic coupled to the one or more substrates, wherein the logic is at least partly implemented in one or more of configurable or fixed-functionality hardware, and the logic coupled to the one or more substrates is to detect internal information associated with a solid state drive (SSD), wherein the processor is to be external to the SSD, detect background operations with respect to the SSD based on the internal information, wherein the background operations are to include one or more of current operations or predicted operations, and adjust a hierarchical data placement policy based on the background operations.

Example 18 includes the processor of Example 17, wherein the logic is to detect, based on the internal information, an idle condition in which the background operations have fallen below a threshold, and adjust the hierarchical data placement policy based on the idle condition.

Example 19 includes a method of operating a processor, the method comprising detecting internal information associated with a solid state drive (SSD), wherein the processor is external to the SSD, detecting background operations with respect to the SSD, wherein the background operations include one or more of current operations or predicted operations, and adjusting a hierarchical data placement policy based on the background operations.

Example 20 includes the method of Example 19, further including detecting, based on the internal information, an idle condition in which the background operations have fallen below a threshold, and adjusting the hierarchical data placement policy based on the idle condition.

Technology described herein therefore enables a cache controller to determine how busy a NAND SSD is with internal operations. The technology also enables the cache controller to adjust I/O requests and caching policies (and their timing) accordingly. The technology obtains the internal-operation busy information, as well as cache policy adjustments that use this information, for multiple types of disk caching configurations. The technology may be deployed in cache controller products such as, for example, CAS (Cache Acceleration Software), RST (Rapid Storage Technology), RSTe (RST Enterprise), VROC (Virtual RAID/Redundant Array of Independent Disks on CPU), and so forth.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. At least one non-transitory computer readable storage medium comprising a set of instructions, which when executed by a processor, cause the processor to:
    detect internal information associated with a solid state drive (SSD), wherein the processor is to be external to the SSD, wherein the internal information is to include a first measurement of host-issued input/output (I/O) data and a second measurement of media I/O data;
    detect background operations with respect to the SSD based on the internal information, wherein the background operations are to include one or more of current operations or predicted operations, and wherein the background operations are detected based on there being a larger amount of the media I/O data than the host-issued I/O data; and
    adjust a hierarchical data placement policy based on the background operations.

2. The at least one non-transitory computer readable storage medium of claim 1, wherein the instructions, when executed, further cause the processor to:
    detect, based on the internal information, an idle condition in which the background operations have fallen below a threshold; and
    adjust the hierarchical data placement policy based on the idle condition.

3. The at least one non-transitory computer readable storage medium of claim 2, wherein the SSD is a caching storage device for an additional storage device and wherein the instructions, when executed, further cause the processor to:
    transfer, in response to the idle condition, data from the SSD to the additional storage device;
    retrieve prefetch data from the additional storage device; and
    write the prefetch data to the SSD.

4. The at least one non-transitory computer readable storage medium of claim 2, wherein an additional storage device is a caching storage device for the SSD and wherein the instructions, when executed, further cause the processor to:
    transfer, in response to the idle condition, data from the additional storage device to the SSD;
    retrieve prefetch data from the SSD; and
    write the prefetch data to the additional storage device.

5. The at least one non-transitory computer readable storage medium of claim 1, wherein the internal information is to include a first asynchronous notification of a start of the background operations and a second asynchronous notification of an end of the background operations.

6. The at least one non-transitory computer readable storage medium of claim 1, wherein the internal information is to include a measurement of background input/output (I/O) data, and wherein the instructions, when executed, further cause the processor to issue a request for the measurement.

7. The at least one non-transitory computer readable storage medium of claim 1, wherein the instructions, when executed, further cause the processor to issue a request for the first measurement and the second measurement.

8. The at least one non-transitory computer readable storage medium of claim 1, wherein the background operations are to include one or more of defragmentation operations, data scrubbing operations, data refresh operations, or wear leveling operations, and wherein the hierarchical data placement policy is to include one or more of a caching policy or a tiering policy.

9. A computing system comprising:
    a solid state drive (SSD);
    a processor coupled to the SSD, wherein the processor is external to the SSD; and
    an additional storage device coupled to the processor, wherein one or more of the SSD or the additional storage device include a set of instructions, which when executed by the processor, cause the processor to:
        detect internal information associated with the SSD, wherein the internal information is to include a first measurement of host-issued input/output (I/O) data and a second measurement of media I/O data,
        detect background operations with respect to the SSD based on the internal information, wherein the background operations are to include one or more of current operations or predicted operations, and wherein the background operations are detected based on there being a larger amount of the media I/O data than the host-issued I/O data, and
        adjust a hierarchical data placement policy based on the background operations.

10. The computing system of claim 9, wherein the instructions, when executed, further cause the processor to:
    detect, based on the internal information, an idle condition in which the background operations have fallen below a threshold, and
    adjust the hierarchical data placement policy based on the idle condition.

11. The computing system of claim 10, wherein the SSD is a caching storage device for the additional storage device and wherein the instructions, when executed, further cause the processor to:
  transfer, in response to the idle condition, data from the SSD to the additional storage device,
  retrieve prefetch data from the additional storage device, and
  write the prefetch data to the SSD.

12. The computing system of claim 10, wherein the additional storage device is a caching storage device for the SSD and wherein the instructions, when executed, further cause the processor to:
  transfer, in response to the idle condition, data from the additional storage device to the SSD,
  retrieve prefetch data from the SSD, and
  write the prefetch data to the additional storage device.

13. The computing system of claim 9, wherein the internal information is to include a first asynchronous notification of a start of the background operations and a second asynchronous notification of an end of the background operations.

14. The computing system of claim 9, wherein the internal information is to include a measurement of background input/output (I/O) data, and wherein the instructions, when executed, further cause the processor to issue a request for the measurement.

15. The computing system of claim 9, wherein the instructions, when executed, further cause the processor to issue a request for the first measurement and the second measurement.

16. The computing system of claim 9, wherein the background operations are to include one or more of defragmentation operations, data scrubbing operations, data refresh operations, or wear leveling operations, and wherein the hierarchical data placement policy is to include one or more of a caching policy or a tiering policy.

17. A processor comprising:
  one or more substrates; and
  logic coupled to the one or more substrates, wherein the logic is at least partly implemented in one or more of configurable or fixed-functionality hardware, and the logic coupled to the one or more substrates is to:
    detect internal information associated with a solid state drive (SSD), wherein the processor is to be external to the SSD, wherein the internal information is to include a first measurement of host-issued input/output (I/O) data and a second measurement of media I/O data;
    detect background operations with respect to the SSD based on the internal information, wherein the background operations are to include one or more of current operations or predicted operations, and wherein the background operations are detected based on there being a larger amount of the media I/O data than the host-issued I/O data; and
    adjust a hierarchical data placement policy based on the background operations.

18. The processor of claim 17, wherein the logic is to:
  detect, based on the internal information, an idle condition in which the background operations have fallen below a threshold; and
  adjust the hierarchical data placement policy based on the idle condition.

19. A method of operating a processor, the method comprising:
  detecting internal information associated with a solid state drive (SSD), wherein the processor is external to the SSD, wherein the internal information is to include a first measurement of host-issued input/output (I/O) data and a second measurement of media I/O data;
  detecting background operations with respect to the SSD, wherein the background operations include one or more of current operations or predicted operations, and wherein the background operations are detected based on there being a larger amount of the media I/O data than the host-issued I/O data; and
  adjusting a hierarchical data placement policy based on the background operations.

20. The method of claim 19, further including:
  detecting, based on the internal information, an idle condition in which the background operations have fallen below a threshold; and
  adjusting the hierarchical data placement policy based on the idle condition.

* * * * *